July 22, 1952     H. T. JONES     2,603,872
COMBINED FILLET AND CYLINDER GAUGE, CALIPER, PROTRACTOR, AND COMPASS
Filed Jan. 17, 1949     2 SHEETS—SHEET 2
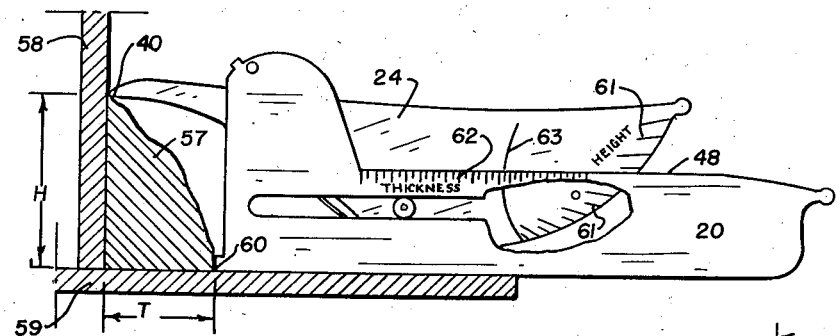
Fig. 11
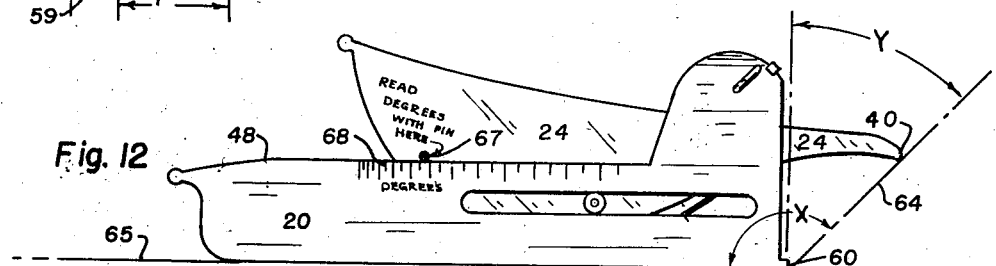
Fig. 12
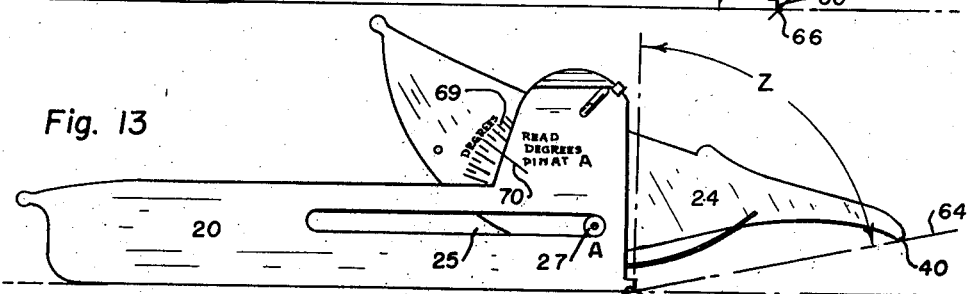
Fig. 13
Fig. 14
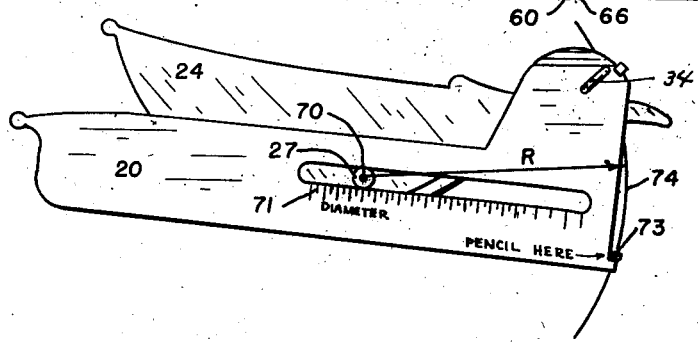
Fig. 15
Inventor
HAROLD T. JONES
BY Martin E. Anderson
Attorneys Patented July 22, 1952

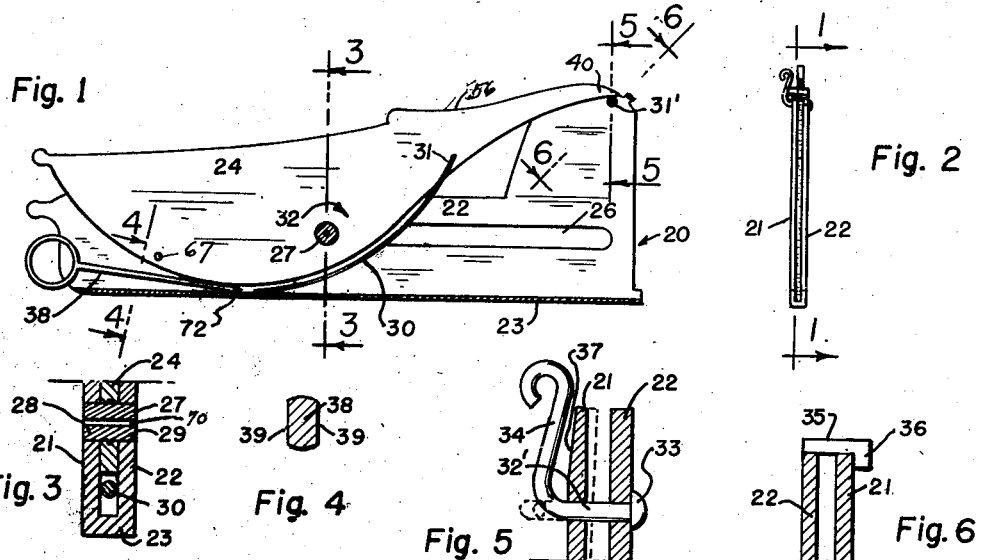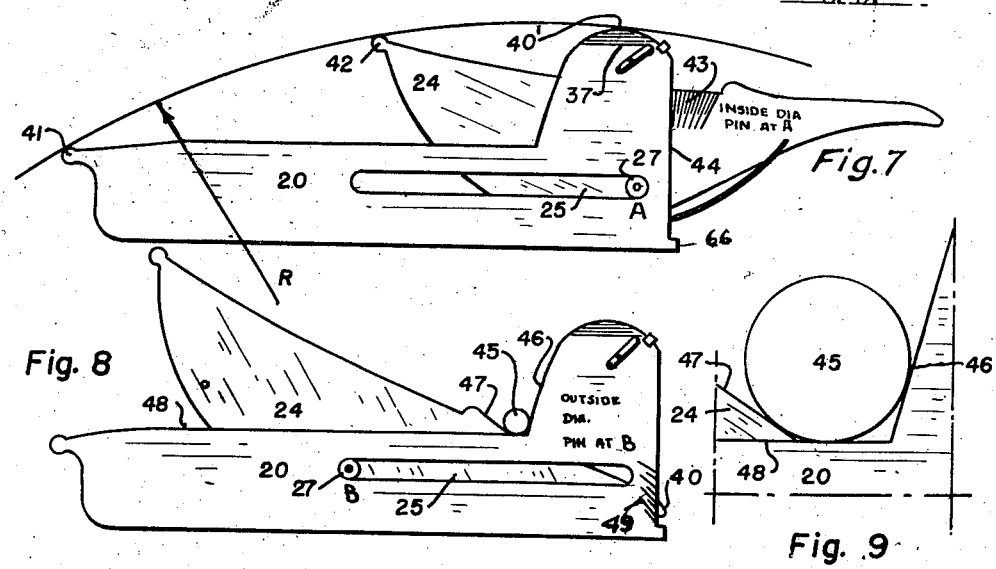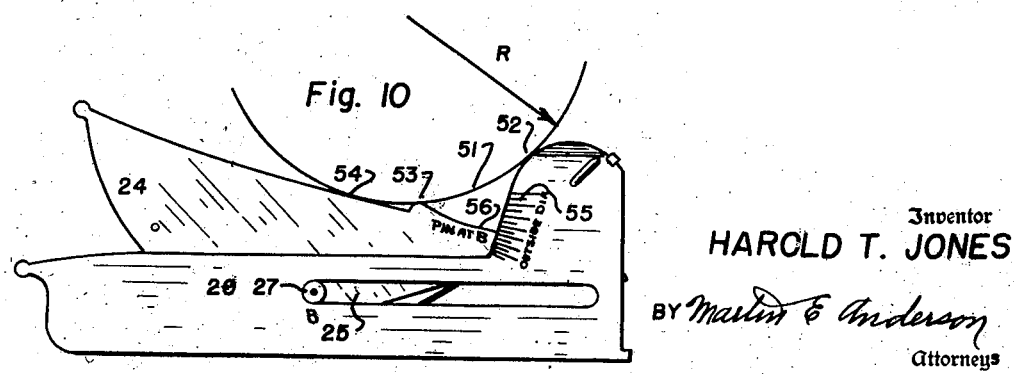

2,603,872

UNITED STATES PATENT OFFICE 2,603,872

COMBINED FILLET AND CYLINDER GAUGE, CALIPER, PROTRACTOR, AND COMPASS

Harold T. Jones, Vallejo, Calif.

Application January 17, 1949, Serial No. 71,255

20 Claims. (Cl. 33—1)

This invention relates to improvements in measuring devices.

The principal object of the invention is to provide a versatile instrument which will measure angles, inside and outside dimensions between surfaces, radius of curvature of convex and concave surfaces, outside diameters of circular surfaces, altitude and base of right triangles, and also serve as a drafting device.

Further objects, advantages, and salient features will become apparent from a consideration of the specification to follow, the appended claims, and the accompanying drawing, in which:

Figure 1 is a section taken on line 1—1, Figure 2;

Figure 2 is an end elevation of the device;

Figure 3 is an enlarged section taken on line 3—3, Fig. 1;

Figure 4 is an enlarged section taken on line 4—4, Fig. 1;

Figure 5 is an enlarged section taken on line 5—5, Fig. 1;

Figure 6 is an enlarged section taken on line 6—6, Fig. 1;

Figure 7 is a side elevation showing the device in use measuring the radius of a concave surface;

Figures 8 and 9 illustrate measurement of the diameter of a small rod, Figure 9 being an enlarged fragment of Figure 8;

Figure 10 illustrates measurement of the diameter of a larger cylindrical object;

Figure 11 illustrates measurement of the altitude and base of a right triangle;

Figures 12 and 13 illustrate measurement of angles;

Figure 14 illustrates drawing of circles; and

Figure 15 illustrates use as an inside or outside caliper.

Referring in detail to the drawing and particularly to Figures 1 to 6, the instrument comprises, in general, a channel shaped member 20 having side walls 21, 22, joined by a bight or base portion 23, and a member 24 which is disposed between the walls for pivotal and rectilinear movement relative thereto.

The pivotal and rectilinear movement referred to is effected by a pair of slots 25, 26, in side walls 21, 22, and a circular pin 27 secured to member 24 having portions 28, 29 which extend into the respective slots. A spring 30 is secured to member 24 in a slot 31 and urges member 24 in a clockwise direction as indicated by arrow 32, Figure 1.

Members 20, 24, may be fixedly secured together in any position of adjustment by a locking device 31' which has a pintle portion 32' extending between the side walls 21, 22, one end of which is provided with a head 33, and the other end with a lever arm 34. The lever arm is disposed at an acute angle to the pintle 32' so that rotation of the arm in a counterclockwise direction, as viewed in Figure 1, will cam side walls 21, 22, together. Side wall 21 is tapered in thickness toward the top edge adjacent the lever, as indicated by reference character 37, to aid in the camming action.

A lug 35 is integrally secured to wall 22, the end of the lug having an ear 36 bent over wall 21. This construction limits movement of the walls 21, 22, away from each other and the ear serves as a limit stop for the lever in its clockwise direction of movement.

As shown in Figure 1, a pin 38 having flattened sides 39, is disposed between walls 21, 22 and is wedged between the lower curved edge of member 24 and the inner surface of bight 23, this being the transport or non-use position of the various parts. The pintle 32' also serves as a limit stop for the end 40 of member 24. In the position of the parts, as shown in Figure 1, pin 27 is slightly to the right of the left end of slots 25, 26, and when the pin is moved to the left of this position, end 40 will clear and pass beneath pintle 32' so that this end may be disposed in the various positions shown in Figures 7 to 15.

The purpose of the various parts above described can best be understood from a description of the manner in which the instrument is used for various purposes.

Figure 7 shows the instrument in use measuring the radius of a circular arc having a radius R. With the pin 27 at the right end of the slots 25, 26, the instrument is placed so that it contacts the arc at arcuate surfaces 40', 41 on member 20 and point 42 on member 24. The radius of the circle is then read on calibrated scale 43, the reading being taken at edge 44 of the instrument. This scale may, of course, be calibrated to the diameter of the circle rather than the radius, if so desired.

Figures 8 and 9 show the instrument in use measuring the diameter of a small rod 45. With the pin 27 at the left end of the slots, the rod is placed between edges 46, 47, and 48 so that it contacts at three points as best shown in Figure 9. The diameter is then read on scale 49, the reading being taken at one edge of pointer 40. Edges 46 may be slightly convex, edge 47 slightly concave, and edge 48 straight, or all of said edges may be straight or substantially straight, these edges being substantially as shown in the drawing and the exact shape not being important since three points of contact may be effected with curved or straight edges, and as is well-known, the diameter of a circle may be determined if the relative positions of three points of contact on its circumference be known, and it is apparent that a scale may be suitably calibrated to measure such diameter.

Figure 10 shows the instrument in use measuring the diameter or radius of a large cylindrical surface or arc 51. With the pin 27 at the left end of the slots, the instrument is placed so that it contacts arc 51 at points 52, 53, and 54. The reading is then taken on scale 55 at edge 56. The surfaces about points 52 and 53 are preferably convex, and surface 54 is substantially straight, although it will be apparent that these surfaces, like the surfaces just described, may be of such shape to effect a three point contact on the circle.

Figure 11 shows the device in use measuring the altitude and base of a right triangle, these dimensions being indicated by H and T representing the height and thickness of weld 57 disposed in the corner between plates 58 and 59. The tip of finger 40, which is slightly concave at its lower edge, is placed on the top of the weld and the projecting foot 60 against its outer edge. The fillet height H is then read on scale 61, at upper edge 48, and the fillet thickness T read on scale 62 where curved line 63 intersects it, the shape of line 63 being substantially as shown in the drawing or any other suitable shape which will calibrate the line to the scale 62 with which it cooperates.

Figure 12 shows the instrument in use measuring angle X between lines or surfaces 64, 65. Member 20 is placed on line or surface 65 with the corner 66 of foot 60 at the intersection between 64, 65. The pin 38 is then inserted in hole 67 and member 24 slid to the right until tip 40 touches line or surface 64, the pin remaining in contact with edge 48. The angle X is then read on scale 68 at the point where pin 38 coincides therewith. Scale 68 may be calibrated to read angle X, as just described, or angle Y which equals angle X minus 90 degrees. Calibration for angle Y would probably, in most cases, be more desirable.

In one embodiment of the invention the instrument will measure an angle Y between 0 and about 65 degrees. To measure angles between about 45 degrees and 90 degrees (or somewhat in excess thereof) the device is used as shown in Figure 13. The corner 66 is placed as before described and pin 27 moved to the right end of slot 25. Tip 40 is then rotated until it contacts line or surface 64 and the angle Z is read on scale 69 at line 70.

Figure 14 shows the device in use for scribing or drawing a circle. Pin 38 is inserted through hole 70 in pin 27 and moved along scale 71 until the center of the pin is at a desired diameter. The parts are then locked by lever 34 and the device placed against the work. The conical point 72 on the pin 38 is pressed into the work, in the same manner as the leg of a compass, and a pencil point or scriber is placed in the corner 73. The instrument is then rotated with the pencil or scriber about the axis of pin 38 thus drawing the circular line 74 having a radius R. The scale 71 may, of course, be calibrated to read radius rather than diameter, if so desired.

Figure 15 shows a still further use of the device where it may be employed as either an inside or outside caliper. The pin 27 is moved to the left end of slot 25 and circular measuring points 41, 42 are disposed to measure an inside dimension indicated by the distance "in" (inside) or an outside dimension indicated by "out." These dimensions are then read on the appropriate scale 75 or 76.

Having described the invention what is claimed as new is:

1. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for simultaneously contacting an object to be measured, scale means on one of said members, and means on the other member cooperating with the scale means for indicating various measurements when the members are disposed in various positions of longitudinal and angular adjustment relative to each other.

2. A measuring instrument in accordance with claim 1 wherein said guide means comprises a slot and the journal means comprises a pin projecting laterally of the second member having a circular portion slidable and rotatable in the slot.

3. A measuring instrument in accordance with claim 1 including means for locking the members together in any relative position of adjustment.

4. A measuring instrument in accordance with claim 1 wherein the first member comprises a pair of spaced parallel flat plates connected together along corresponding edges by means extending therebetween, and the second member is a flat plate-like member disposed between the plates aforesaid.

5. A fillet gage comprising an elongated first member having a straight edge adapted to lie on a surface, one end of said member having an abutment adapted to abut one corner of the fillet, a second elongated member disposed adjacent and parallel to the first member, elongated guide means on the first member extending longitudinally thereof, journal means on the second member fixed relative to the ends thereof engaging the guide means and connecting the second member to the first member for relative sliding movement to render a portion of the second member extensible beyond said one end of the first member axially and to both sides of the longitudinal axis of the first member and relatively rotatable at points along its direction of movement, the sliding movement and rotatable movement being independent of each other, said portion comprising a finger having a reference point at its end adapted to abut the other corner of the fillet, and scale means on the members for indicating the distance said reference point projects beyond said abutment and the distance thereof from a line forming an extension of said edge, whereby the thickness and height of the fillet may be measured.

6. A cylinder measuring gage comprising a first elongated member, a second elongated member disposed adjacent and parallel to the first member, elongated guide means extending longitudinally of the first member, journal means disposed between the ends of the second member and fixed relative to the ends thereof engaging the guide means and connecting the second member to the first member for relative sliding movement, said second member being rotatable in said guide means and said guide means having stop means at both ends thereof to limit longitudinal movement of the second member, a projection on the first member extending laterally of its longitudinal axis, three surfaces on said members providing points of contact to engage a cylinder at spaced points around its periphery, one of said surfaces being on the projection, and scale means on the members adapted to indicate the diameter of the cylinder when said journal means is disposed at one limit of its movement, and other scale means on the members adapted to indicate the diameter of a cylinder when said journal means is at the other limit of its movement.

7. A protractor comprising an elongated first member having a straight edge adapted to lie on a straight line, one end of said member having a reference point adapted to be disposed at the intersection of a straight line coincident to said edge and a second straight line angularly related thereto, a second elongated member disposed adjacent and parallel to the first member, elongated guide means extending longitudinally of the first member, journal means on the second member engaging the guide means and connecting the second member to the first member for relative sliding movement to render a portion of the second member extensible beyond said reference point, the guide means also permitting rotation of the second member relative to the first member, the guide means having stop means at one end thereof to limit sliding movement of the second member in the direction of the extension of said portion beyond the first member, said portion having a finger with a reference point at its end adapted to lie on said second line, scale means on said members for indicating the angle between said lines when said journal means is disposed at said limit of movement, and other scale means on said members for indicating the angle between said lines when said second member is disposed at a point other than at its limit of movement when said second member is constrained to move parallel to said guide means.

8. A compass comprising; a first elongated member having an abutment at one end thereof against which a pencil or scriber may be disposed, said member having an elongated slot extending longitudinally thereof, a second elongated member having journal means thereon engaging the slot and movable longitudinally therein, an aperture extending through said journal means for receiving a pin adapted to be disposed at the center of a circle to be scribed, scale means on said first member adjacent said slot calibrated in distances between the axis of said pin and said abutment for indicating the radius or diameter of a circle to be scribed, and means for locking said second member to said first member at all points along said slot.

9. A combined fillet and cylinder gage, caliper, protractor, and compass, comprising; a first elongated flat member having substantially parallel lower and upper edges extending longitudinally thereof, an elongated slot in said member between the edges thereof extending substantially parallel to said edges, said member having an abutment at one end thereof, a second elongated member disposed adjacent and parallel to the first member having journal means thereon between its ends engaging the slot, the second member being slideable and rotatable relative to the first member, a finger on said second member adapted to extend beyond said abutment various distances having an end adapted to cooperate with the abutment to measure the relative position of said end and a point on a straight line defined by said lower edge and the intersection of the abutment thereon, caliper means on the opposite ends of the members adapted to measure inside or outside dimensions, a projection at the first named end of the first member extending laterally thereof and having a cylinder engaging surface thereon, other cylinder engaging surfaces on said members along top edges thereof, and scale means on the members for indicating the various measurements.

10. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members contacting an object to be measured, scale means on one of said members, and means on the other member cooperating with the scale means for indicating various measurements when the members are disposed in various positions of longitudinal and angular adjustment relative to each other, said surfaces being disposed at corresponding ends of the members and adapted to measure the inside or outside distance between two surfaces when said journal means is disposed at one limit of its movement.

11. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for contacting an object to be measured, scale means on one of said members, and means on the other member cooperating with the scale means for indicating various measurements when the members are disposed in various positions of longitudinal and angular adjustment relative to each other, two of said surfaces being on one of said members and one of said surfaces being on the other of said members, one of the three surfaces aforesaid being on a projection on the first member extending laterally of its longitudinal axis, the three surfaces providing points of contact to engage a circle at spaced points around its periphery and the scale means being adapted to indicate the diameter of a circle when said journal means is disposed at one limit of its movement.

12. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for contacting an object to be measured, scale means on one of said members, means on the other member cooperating with the scale means for indicating various measurements when the members are disposed in various positions of longitudinal and angular adjustment relative to each other, the first member being provided with a straight edge adapted to lie on a straight line and having a reference point at one end thereof, the finger of said second member providing another reference point adapted to extend beyond said first-named reference point and laterally of the straight line, and the scale means including two scales, for indicating, respectively, the distance the finger reference point extends beyond the first-named reference point and laterally of the straight line.

13. A measuring instrument in accordance with claim 12 wherein the scales are calibrated in linear distances to measure the base and altitude of a right triangle when said journal means is between its limits of movement.

14. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for contacting an object to be measured, scale means on one of said members, means on the other member cooperating with the scale means for indicating various measurements when the members are disposed in various positions of longitudinal and angular adjustment relative to each other, the first member being provided with a straight edge adapted to lie on a straight line and having a reference point at one end thereof, the finger of said second member providing another reference point adapted to extend beyond said first-named reference point and laterally of the straight line, said scale means being calibrated in degrees, to indicate the angle between said straight line and a line drawn between said reference points when said journal means is at one limit of its movement.

15. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for contacting an object to be measured, scale means on one of said members, means on the other member cooperating with the scale means for indicating various measurements when the members are disposed in various positions of longitudinal and angular adjustment relative to each other, the first member being provided with a straight edge adapted to lie on a straight line and having a reference point at one end thereof, the finger of said second member providing another reference point adapted to extend beyond said first-named reference point and laterally of the straight line, means on said second member adapted to slide parallel to said straight edge, the intersection of the last-named means and scale means on the first member, calibrated in degrees, indicating an angle between said straight line and a line drawn between said reference points when said journal means is between its limits of movement.

16. A measuring instrument, comprising; a first elongated member, a second elongated member disposed adjacent and parallel to the first member, the second member having a surface engaging finger at one end thereof, elongated guide means disposed between the longitudinal edges of the first member extending longitudinally thereof, journal means disposed between the ends of the second member and fixed relative to the ends thereof engaging the guide means and connecting the second member to the first member for relative sliding movement to render said finger extensible beyond one end of the first member axially and to both sides of the longitudinal axis of the first member and relatively rotatable at all points along its direction of movement, the sliding movement and rotatable movement being independent of each other, and the guide means being constructed to limit movement of the journal means in opposite directions, surfaces on said members for contacting an object to be measured, scale means on one of said members, and means on the other member cooperating with the scale means for indicating various measurements when the members are disposed in various positions of longitudinal and angular adjustment relative to each other, the first member being provided with an abutment at one end thereof against which an end of a pencil or scriber may be disposed, and said journal means being provided with an aperture therethrough for receiving a pin adapted to be disposed at the center of a circle to be scribed, the scale means including a scale disposed adjacent the guide means adapted to indicate the distance between the abutment and pin.

17. A protractor comprising an elongated first member having a straight edge adapted to lie on a straight line, one end of said member having a reference point adapted to be disposed at the intersection of a straight line coincident to said edge and a second straight line angularly related thereto, a second elongated member disposed adjacent and parallel to the first member, elongated guide means extending longitudinally of the first member, journal means on the second member engaging the guide means and connecting the second member to the first member for relative sliding movement to render a portion of the second member extensible beyond said reference point, the guide means also permitting rotation of the second member relative to the first member, the guide means having stop means at one end thereof to limit sliding movement of the second member in the direction of the extension of said portion beyond the first member, said portion having a finger with a reference point at its end adapted to lie on said second line, scale and indicia means on said members for indicating the angle between said lines when said journal means is disposed at said limit of movement.

18. A protractor comprising an elongated first member having a straight edge adapted to lie on a straight line, one end of said member having a reference point adapted to be disposed at the intersection of a straight line coincident to said edge and a second straight line angularly related thereto, a second elongated member disposed adjacent and parallel to the first member, elongated guide means extending longitudinally of the first member, journal means on the second member engaging the guide means and connecting the second member to the first member for relative sliding movement to render a portion of the second member extensible beyond said reference point, the guide means also permitting rotation of the second member relative to the first member, the guide means having stop means at one end thereof to limit sliding movement of the second member in the direction of the extension of said portion beyond the first member, said portion having a finger with a reference point at its end adapted to lie on said second line, and scale and indicia means on said members for indicating the angle between said lines when said second member is disposed at a point other than at its limit of movement when said second member is constrained to move parallel to said guide means.

19. A measuring instrument, comprising; a first member having an edge adapted to lie on a straight line, one end of said edge forming a reference point, a second member disposed adjacent and parallel to the first member, the second member having a surface engaging finger with a reference point at one end thereof, elongated guide means on the first member extending substantially parallel to said edge, journal means engaging the guide means and connecting the second member to the first member for relative sliding movement to render said finger extensible beyond one end of the first member and relatively rotatable at all points along its direction of movement, the sliding movement and rotatable movement being independent of each other, scale means on one of said members, means on the other member cooperating with the scale means for indicating various measurements when the members are disposed in various positions of longitudinal and angular adjustment relative to each other, with the straight edge contacting a straight line, the first reference point contacting a portion of an object to be measured, and the second reference point contacting another portion of the object.

20. A measuring instrument in accordance with claim 19 wherein the scale means includes a scale for indicating the angle between said straight line and a line intersecting the two reference points.

HAROLD T. JONES.

REFERENCES CITED

The following references are of record in the file of this patent:

UNITED STATES PATENTS

| Number | Name | Date |
|---|---|---|
| 112,793 | Ellis | Mar. 21, 1871 |
| 144,003 | Waterbury | Oct. 28, 1873 |
| 345,978 | Lombard | July 20, 1886 |
| 359,372 | Warnock | Mar. 15, 1887 |
| 367,290 | Gilmer | July 26, 1887 |
| 607,907 | Allen | July 26, 1898 |
| 735,207 | Campbell | Aug. 4, 1903 |
| 990,385 | Pierde | Apr. 25, 1911 |
| 1,093,919 | Dennis | Apr. 21, 1914 |
| 1,133,587 | Stenerson | Mar. 30, 1915 |
| 1,281,526 | Curtis | Oct. 15, 1918 |
| 1,394,347 | Pierson | Oct. 18, 1921 |
| 1,526,114 | Brown | Feb. 10, 1925 |
| 1,529,293 | Beulwitz | Mar. 10, 1925 |
| 1,628,713 | Ebert et al. | May 17, 1927 |
| 1,739,440 | Ciliske | Dec. 10, 1929 |
| 1,841,972 | Mosley | Jan. 19, 1932 |
| 2,185,808 | Grennon | Jan. 2, 1940 |
| 2,362,907 | Levin | Nov. 14, 1944 |
| 2,425,862 | Budnick | Aug. 19, 1947 |
| 2,438,337 | Gordon | Mar. 23, 1948 |
| 2,526,056 | Weston | Oct. 17, 1950 |